United States Patent
Lanternari et al.

(10) Patent No.: US 11,602,187 B2
(45) Date of Patent: Mar. 14, 2023

(54) RETROREFLECTING FABRICS

(71) Applicant: EREZ THERMOPLASTIC PRODUCTS—AGRICULTURE COOPERATIVE ASSOCIATION LTD., M.P. Ashkelon Coast (IL)

(72) Inventors: Daniel Lanternari, M.P. Negev (IL); Yaakov Saban, Omer (IL); Yaron Conroy, Beer Sheva (IL)

(73) Assignee: EREZ THERMOPLASTIC PRODUCTS—AGRICULTURE COOPERATIVE ASSOCIATION LTD., Kibbutz Erez (IL)

( * ) Notice: Subject to any disclaimer, the term of this patent is extended or adjusted under 35 U.S.C. 154(b) by 661 days.

(21) Appl. No.: 16/497,703

(22) PCT Filed: Mar. 26, 2018

(86) PCT No.: PCT/IL2018/050348
§ 371 (c)(1),
(2) Date: Sep. 25, 2019

(87) PCT Pub. No.: WO2018/178974
PCT Pub. Date: Oct. 4, 2018

(65) Prior Publication Data
US 2021/0282483 A1 Sep. 16, 2021

(30) Foreign Application Priority Data
Mar. 28, 2017 (IL) .......................................... 251430

(51) Int. Cl.
*A41D 31/32* (2019.01)
*D06N 3/00* (2006.01)
*G02B 5/128* (2006.01)

(52) U.S. Cl.
CPC .......... *A41D 31/325* (2019.02); *D06N 3/0063* (2013.01); *D06N 3/0088* (2013.01); *G02B 5/128* (2013.01); *D06N 2209/0876* (2013.01)

(58) Field of Classification Search
CPC ...... A41D 31/325; A41D 31/32; A41D 31/00; D06N 2209/0876; D06N 3/0063; D06N 3/0088; G02B 5/128
See application file for complete search history.

(56) References Cited

U.S. PATENT DOCUMENTS

| | | | |
|---|---|---|---|
| 4,103,060 A | 7/1978 | Bingham et al. | |
| 4,763,985 A | 8/1988 | Bingham | |
| 5,620,775 A | 4/1997 | Laperre | |
| 9,217,817 B2 | 12/2015 | Zhang et al. | |
| 2004/0248483 A1 | 12/2004 | Bolta | |
| 2005/0245645 A1 | 11/2005 | Howie | |
| 2014/0118827 A1 | 5/2014 | Zhang et al. | |

FOREIGN PATENT DOCUMENTS

| | | |
|---|---|---|
| CN | 103919314 A | 7/2014 |
| CN | 104275887 A | 1/2015 |
| CN | 104354352 A | 2/2015 |
| CN | 204575882 U | 8/2015 |

(Continued)

*Primary Examiner* — Arti Singh-Pandey
(74) *Attorney, Agent, or Firm* — Vorys, Sater, Seymour and Pease LLP; Anthony P. Venturino; Maryellen Feehery Hank

(57) ABSTRACT

Provided are fabrics having retroreflectivity, products produced therefrom and methods of their manufacture.

20 Claims, 5 Drawing Sheets

(56) References Cited

FOREIGN PATENT DOCUMENTS

| | | |
|---|---|---|
| CN | 204679670 U | 9/2015 |
| CN | 105060724 A | 11/2015 |
| EP | 0 615 788 A1 | 9/1994 |
| EP | 2 886 617 A2 | 6/2015 |
| JP | 2002-309416 A | 10/2002 |
| KR | 2003-0019662 A | 3/2003 |
| WO | 99/03007 A1 | 1/1999 |
| WO | 2015/171405 A1 | 11/2015 |
| WO | 2015/171406 A1 | 11/2015 |
| WO | 2015/175024 A2 | 11/2015 |
| WO | 2016/053734 A1 | 4/2016 |

RETROREFLECTING FABRICS

TECHNOLOGICAL FIELD

The present disclosure concerns fabrics having retroreflectivity, products produced therefrom and methods of their manufacture.

BACKGROUND ART

References considered to be relevant as background to the presently disclosed subject matter are listed below:
EP 2886617
WO 2015/171405
U.S. Pat. No. 9,217,817
U.S. Pat. No. 4,763,985
U.S. Pat. No. 4,103,060
WO 99/03007
U.S. Pat. No. 5,620,775

Acknowledgement of the above references herein is not to be inferred as meaning that these are in any way relevant to the patentability of the presently disclosed subject matter.

BACKGROUND

Reflectance of irradiated light is often used to increase visibility of various objects in various environmental conditions. For example, light reflectance may be used for increasing visibility of objects in dark surroundings (e.g. poorly illuminated environment), detecting/identifying survivors or cargo in searching efforts, warning signs or markings, etc.

One of the methods to increase reflectance is the use of pre-dyed fabrics, i.e. fabrics woven from reflective fibers and/or pre-impregnated with reflecting paints. Such fabrics, although providing some degree of reflectivity, provide limited reflectance as often the loading of reflective dye is limited.

Another common method to increase reflectance of an object is applying a retroreflecting paint onto the outer surface of the object. This, however, requires tailoring of the retroreflecting paint to be resistant to environmental conditions, as well as adhere to the specific surface onto which it is applied. When applied to fabrics, such retroreflective paints are often hard to apply due to the absorbability of the fabric. Further, layers of such paints have limited flexibility, hence often cracking and eventually flaking-off the painted fabric. Thus, due to their limited flexibility, such paints are often applied onto the fabric in limited areas and/or in the form of patches, significantly limiting the area that can reflect light.

It is also of note that in order to obtain a desired reflectivity or retroreflectivity, known paints often contain a very high load of reflective particles (typically above 90%). When applied onto a fabric having a given color, such high content of reflective particles will typically mask the color of the fabric onto which the paint is applied, thus masking the fabric's color in illuminated conditions. Such masking of color is especially undesired in safety and life-saving articles (such as life-vests), in which the original color of the fabric needs to be maintained (both for allowing detection in daytime and for meeting strict international regulations). Therefore, such paints are often applied onto very limited areas of the fabric.

In another known technology, fabrics are first coated with a thin reflecting layer (i.e. a mirror layer), onto which the reflective particles are applied or adhered. Although this increases the retroreflectance of the fabric, the production of such fabrics is often costly and complex, as well as results in limited flexibility of the fabric. Such application of a mirror layer also often causes change or masking of the fabric's original color. In most life-saving devices which require light reflectance (e.g. life vests, life rafts, etc.), standard colors or color shades are required which are often unfavorably affected by the presence of mirror-like layers and/or a high concentration of reflective particles.

Hence, there is a need for fabrics with satisfactory retroreflectance, without significantly reducing the fabric's flexibility, that enable manufacturing of articles with a relatively large retroreflective surface, as well as maintaining the fabric's color during normal illumination conditions.

GENERAL DESCRIPTION

Fabrics that provide satisfactory reflectance in poor illumination conditions while substantially maintaining their original color in daytime illumination are provided by the present disclosure, and permit the manufacture of various articles therefrom (e.g. inflatable life-saving garments or equipment) with a large reflective surface.

In one of its aspects, the disclosure provides a retroreflecting fabric, comprising a fabric having an top surface and a bottom surface, at least a portion of the top surface being associated with at least one top layer of a retroreflective composition, the retroreflective composition comprising retroreflective particles at least partially embedded in a matrix of at least one embedding polymeric material.

The term retroreflection or any lingual variation thereof refers to refection of irradiated light along a vector which is parallel to, but opposite in direction, to the irradiating light source with minimum scattering. Thus, the retroreflecting fabric reflects light in an angle of incidence that is greater than zero, regardless of the fabric's angle with respect to the light source. The irradiated light may be in a specific wavelength or a defined band of wavelengths, while the reflected light may be of the same wavelengths of the irradiated light or at different wavelengths. For example, irradiation with visible light (i.e. irradiation in the wavelengths of 400-700 nm) may result in retroreflection of light in the entire visible spectrum, or of specific wavelength bands within the visible spectrum, depending on the composition of the retroreflecting layer. Thus, when the fabrics of this disclosure are irradiated by a light source, at least some of the irradiating light wavelengths are retroreflected from the fabric regardless of the angle of impact, and can be detected.

The retroreflective fabrics described herein may, by some embodiments, have retroreflectivity of visible light of at least 1 candela/(sq.meter·lux) [$cd/(m^2 \cdot lux)$]. In other embodiments, the retroreflecting fabric may have reflectivity of at least 1.2 $cd/(m^2\ lux)$. In some other embodiments, the retroreflecting fabric may have reflectivity of between about 1 to 20 $cd/(m^2 \cdot lux)$, between about 1 to 15 $cd/(m^2 \cdot lux)$, between about 1 to 10 $cd/(m^2 \cdot lux)$, or even between about 1 to 5 $cd/(m^2 \cdot lux)$. It is to be noted that all reflectivity values provided herein are measured according to Israeli Standard 12899 (part 1, 2014), unless specifically noted otherwise. Retroreflectivity of at least 1 $cd/(m^2 \cdot lux)$ is also obtained when measuring the retroreflectance according to international standards EN12899, ASTM-E809, ASTM-E810, or CIE 54 under the same measurement conditions.

The retroreflecting fabrics of this disclosure typically comprise a top-most layer of said retroreflecting composition, that, as will be explained below, contains a relatively low amount of reflecting particles, e.g. at most 60 wt % out of the total weight of the retroreflective composition. This relatively low amount of reflective particles allows obtaining a surface distribution of the particles of between about 10 and 200 particles per cm$^2$ of fabric; such a low surface density of particles allows for relatively large distances between particles, thus minimizing the masking of the fabric's original color. Namely, in the retroreflecting fabrics of this disclosure satisfactory reflectance is obtained by using a relatively low amount of reflective particles that are distributed over a large surface area.

Further, as will also be described below, the retroreflection is obtained by using a relatively thin layer of the retroreflective composition, i.e. ca. 3-10 μm (micrometers). It was found that in the fabrics of this disclosure, increasing the thickness of the retroreflecting layer causes the retroreflectance of the fabric to decrease. Without wishing to be bound by theory, such decrease in retroreflection with increase in the layer's thickness may arise from a denser distribution of the particles in the top layer and overlap between particles, hence limiting the interaction between the impinging light and the particles.

Thus, in another one of its aspects, the disclosure provides a retroreflecting fabric, comprising a fabric having a top surface and a bottom surface, at least a portion of the top surface being associated with at least one top layer of a retroreflective composition, the retroreflective composition comprising at most 60 wt % of retroreflective particles being at least partially embedded in a matrix of at least one embedding polymeric material.

In another aspect, there is provided a retroreflecting fabric, comprising a fabric having a top surface and a bottom surface, at least a portion of the top surface being associated with at least one top layer of a retroreflective composition that comprises retroreflective particles being at least partially embedded in a matrix of at least one embedding polymeric material, the matrix having a thickness of between about 3 and 10 μm.

As will further be explained below, the particles may be fully embedded in the matrix, i.e. the entire surface of the particles are covered by the matrix; or partially embedded in the matrix, such that a portion of the particles protrudes beyond the matrix layer, however the particles being in association with the matrix in a manner that prevents (or minimizes) detachment of the particles from the matrix.

In yet another aspect, there is provided a retroreflecting fabric, comprising a fabric having a top surface and a bottom surface, at least a portion of the top surface being associated with at least one top layer of a retroreflective composition that comprises at most 60 wt % retroreflective particles being at least partially embedded in a matrix of at least one embedding polymeric material, the matrix having a thickness of between about 3 and 10 μm.

It is of further note that, unlike typical reflective or retroreflective fabrics known in the art, the retroreflecting fabrics of this disclosure do not contain metallic reflective layers and/or mirror-like layers. Namely, the fabrics of the present disclosure are absent a metallic reflective layer or mirror-like layer, being either a continuous layer or non-continuous layer, deposited under the retroreflective composition. In fabrics of the present disclosure, the retroreflective composition is applied onto the fabric without pre-coating the top surface of the fabric with a reflecting layer, such as a metallic or mirror layer.

Thus, in another aspect, the present disclosure provides a retroreflecting fabric, comprising a fabric having a top surface and a bottom surface, at least a portion of the top surface being associated with at least one top layer of a retroreflective composition, the retroreflective composition comprising retroreflective particles being at least partially embedded in a matrix of at least one embedding polymeric material, the retroreflecting fabric being devoid of a metallic layer and/or a mirror layer.

The retroreflecting fabric of this disclosure comprises a layered structure in which a fabric layer is associated with, at times sandwiched by, various functional layers, the outermost layer associated with the top face of the fabric being a retroreflecting layer. Fabric refers to a flexible sheet of material that is made of a network of fibers. The fabric may be woven or non-woven fabric, and may be manufactured from natural, synthetic, or a mixture of natural and synthetic fibers.

In the context of the present disclosure, the term retroreflecting fabric will be used to denote a fabric of this disclosure onto which the functional layers have been applied, while the term fabric will be used to denote an uncoated fabric, namely before applying the functional layers.

In another of its aspects, the disclosure provides a retroreflecting fabric, comprising a fabric having a top surface and a bottom surface, at least a portion of the top surface being associated with at least one top layer of a retroreflective composition, the retroreflective composition comprising retroreflective particles at least partially embedded in a matrix of at least one embedding polymeric material, and the bottom surface being coated with at least one first bottom layer comprising at least one second polymeric material.

In some embodiments, the fabric is a synthetic fabric, i.e. made of synthetic fibers, such as polyamide (nylon), polyester, polypropylene, polyethylene, carbon fiber, pararamide synthetic fiber (Kevlar), glass fibers, chlorosulfonated polyethylene (CSPE, Hypalon®), and others, and may have an areal density of between about 50 and 500 g/m$^2$.

The fabric has a top surface and a bottom surface onto at least one of which functional layers are applied. The term top surface will refer to an external surface of the fabric onto which a retroreflective composition is applied and hence will eventually face outward in the article prepared from the retroreflecting fabric; while the term bottom surface will refer to the opposite surface of the fabric that will eventually be an inward-facing surface of the article. Accordingly, a top layer will refer to a layer that is applied onto the top surface of the fabric, while a bottom layer will be a layer that is applied to the bottom surface of the fabric.

As noted, the fabric may be sandwiched between top and bottom functional layers, the functional layers provide different properties to the retroreflecting fabric, such as water impermeability, solvent resistance, reflectivity, strength, abrasion resistance, etc. Each such functional layer typically comprises at least one polymeric material.

The term polymer or polymeric material means to denote a molecule that is composed of numerous repeating units or building blocks. The term includes homopolymers, copolymers, such as block, graft, random and alternating copolymers as well as terpolymers, further including their derivatives, combinations and blends thereof. In addition to the above the term includes all geometrical configurations of such structures including linear, block, graft, random, alternating, branched structures, etc. and combination thereof. Block copolymer is meant to encompass a polymer formed from two or more homo-polymer subunits (blocks) linearly linked by chemical bonds (i.e. the blocks are connected end-to-end). Block copolymers with two, three, four and multiple homo-polymer units are referred to as di-block, tri-block, tetra-blocks and multi-blocks respectively. The number of monomer types in a block co-polymer may be less than or equal to the number of blocks. Thus, an ABC linear tri-block consists of three monomer types, whereas an ABA linear tri-block consists of two monomer types. One, non-limiting example, of a block-copolymer is a polyurethane polymer, comprising isocyanate moieties and polyol moieties (which may be aliphatic, aromatic, heterocyclic, alicyclic units, which may also contain one or more inorganic atoms such as sulfur, phosphor, nitrogen, halogens, etc.).

The polymeric material may be at least one thermoplastic polymer and/or at least one thermoset polymer. As used herein, a thermosetic polymer is a polymer or a polymer resin of at least one thermosetic polymer, as known in the art, that undergoes curing by heating, a chemical reaction, and/or irradiation. The thermosetic polymer may be selected, in a non-limiting fashion, amongst thermoset silicone polymers or thermoset organic polymers such as furan resins, amino resins, polyurethanes, polyimides, phenolic resins, cyanate ester resins, bismaleimide resins, polyesters, acrylic resins, and others.

Thermoplastic polymers are polymers which need not undergo a curing process, and typically have the capability of melting or solidifying upon application of suitable thermal conditions. Non-limiting examples of such thermoplastic resins may include polyolefins, polar thermoplastics, polystyrene, polyvinyl chloride (PVC), acrylonitrile-butadiene-styrene (ABS), styrene copolymers, polyacrylonitrile, polyacrylates, polyacrylamides, vinyl acetate polymers, vinyl alcohol polymers, cellulose plastics, thermoplastic elastomers, thermoplastic polyurethanes (TPU), polyester-based thermoplastic elastomers, thermoplastic polyesters, polyethylene terephthalate, polybutylene terephthalate, compatibilized thermoplastic blends, polyacetal, polyethers, polyarylates, polycarbonates, polyamides, polyimides, polybenzimidazoles, aromatic polyhydrazides and polyoxadiazoles, polyphenyl-quinoxalines, polyphenylene sulfide, polyphenylene vinylene, conducting thermoplastics, conducting thermoplastics composites, poly(aryl ether sulfone)s, poly(aryl ether ketone)s, poly(aryl ether ketones-co-sulfones), poly(aryl ether ketone amide)s, polytetrafluoroethylene and mixtures thereof.

A retroreflective composition constitutes the top-most layer of the retroreflecting fabric. The retroreflective composition may be associated with at least a portion of the top surface, at times with the entire top surface of the fabric. The portion of the top surface that is associated with the retroreflective composition may be of any size and form, the portion may be continuous or comprise several non-continuous sub-portions of the top surface. This permits, for example, formation of a reflecting top layer in the form of lettering, numbers or an image. In such cases, the retroreflective top layer may be selectively applied onto defined portions of the top surface by any suitable means.

In some embodiments, the at least one portion of the top surface is the entire top surface of the fabric (i.e. the entire top surface is coated with said top layer).

The retroreflective top layer is associated with the top surface of the fabric, namely, the retroreflective top layer need not be in direct contact with the top surface of the fabric. The retroreflective top layer may be associated with the top surface of the fabric via at least one or more intermediate layers. In such a case, the top-most layer of the retroreflecting fabric will be the retroreflective top layer.

As noted above, the retroreflective top layer is constituted by a retroreflective composition that comprises retroreflective particles that are at least partially embedded in a matrix of at least one embedding polymeric material. The embedding polymeric material may, in some embodiments, be selected from thermoplastic polymers, such as aromatic polyurethane, aliphatic polyurethanes, PVC, polyolefin, TPU/PVC blends, PVC+alloy, TPO (thermoplastic polyolefin), TPE (thermoplastic elastomers), acrylic lacquer, polyvinylidene fluoride (PVDF), and others.

The embedding polymeric material forms a matrix in which the particles are embedded. As used herein, the term embedded or any lingual variation thereof contemplates any manner by which the particles are at least partially incorporated into the polymeric matrix, including for example: attachment of functional groups of the polymer to a functional group on the surface of the particles, distribution of the particles throughout the polymeric matrix, entrapment of the particles in voids within said matrix, random dispersion of the particles within the polymeric matrix, encapsulation inside the polymeric matrix, etc. The degree and uniformity of the embedment may also be a result of chemical and/or physical interactions between the matrix and the particles or the chemical compatibility between the polymer matrix and the particles (such as surface tensions, polarity, hydrophobicity/hydrophilicity, etc.). As noted, the particles may be fully embedded in the matrix, i.e. the entire surface of the particles are covered by the matrix; or partially embedded in the matrix, such that a portion of the particles protrudes beyond the matrix layer, however the particles being in association with the matrix in a manner that prevents (or minimizes) detachment of the particles from the matrix.

The retroreflecting particles may be made of any material that reflects light in a retroreflective manner and at the desired impacting wavelength (such as irradiated light in the visible, IR or UV spectrum). In some embodiments, the particles may be made of metal or a metallic alloy, or at least partially coated with a metal or a metallic alloy.

In other embodiments, the particles may be made of plastic or glass, at least partially coated by a metal or alloy layer. The retroreflective particles may be coated hemispherically (i.e. approximately half of the surface of the particle may be coated), or coated entirely with the metal or metallic alloy.

In some embodiments, the metal may be selected from aluminum, silver, gold, copper, and alloys thereof.

It is to be understood that the particles may be single-type particles (all being of the same type and average size), or a mixture of at least two types of retroreflective particles that may differ in at least one of size, composition, reflectance, shape, etc.

In some embodiments, the particles may have an average particle size of between about 10 and 100 μm.

Typically, the particles are microspheres (solid spheres) or microballoons (hollow spheres), however other shapes are also contemplated to be within the scope of the present disclosure (such as prismatic particles, oval particles, elongated particles, oblong particles, irregular shaped particles, etc.). The average diameter of the particles may be measured by any method known to a person skilled in the art. The term (average) particle size refers to the arithmetic mean of measured diameters, wherein the diameters range ±25% of the mean. When referring to non-spherical particles, the term refers to an average diameter of an imaginary sphere about the longest dimension of the particle.

In some embodiments, the particles are substantially transparent, i.e. made of a material which is substantially transparent to light in the visible wavelengths. However, colored particles are also contemplated, namely particles which absorbed one or more wavelengths. Such colored particles may be used to adjust the color of the retroreflective fabric in case there is a slight deviation from the original color of the fabric due to the application of the various functional layers.

In some embodiments, the retroreflective composition (and hence the retroreflective top layer) comprises at least 10 wt % of said particles from the retroreflective composition.

In other embodiments, the retroreflective composition (and hence the retroreflective top layer) comprises at most 60 wt % of said particles. In some other embodiments, the retroreflective top layer may comprise between about 10 wt % and 60 wt %, between about 20 wt % and 60 wt %, between about 30 wt % and 60 wt %, or even between about 40 wt % and 60 wt % of said particles.

The top layer, by some embodiments, may have an areal density of between about 6-10 g/m², and may have an embedding matrix of a thickness of between about 3 and 10 μm. As noted above, such a thin top layer was surprisingly found to provide improved retroreflection as compared to thicker top layers. Without wishing to be bound by theory, the thin layer reduces the scattering of impacting light as well as the absorbance of light by the embedding matrix.

Further, as noted above, in some embodiments the surface distribution of the particles within the top layer is between about 10 and 200 particles per cm² of fabric, at time between about 10 and 100 particles per cm², or even between about 50 and 100 particles per cm². Such low surface density was surprisingly found to minimize the scattering and provide satisfactory retroreflection at very low concentrations of particles.

By utilizing low concentrations of particles and a thin top layer, desired retroreflection may be obtained, without masking the original color of the fabric and without significantly affecting the fabric's flexibility, as well as reducing costs of production and reducing the overall weight of the retroreflecting fabric.

In some embodiments, the various layers applied onto the fabric, including the retroreflective top layer, do not significantly modify the original color of the fabric. Namely, in some embodiments, the retroreflecting fabric is characterized by color coordinations that deviate by no more than 15% on average from the color coordinations of the fabric when measured according to International Standard CIE94. In other embodiments, each of the color coordinates characterizing the retroreflecting fabric deviates by no more than (±)20% from the corresponding color coordinations of the fabric when measured according to International Standard CIE94. In some other embodiments, each of the color coordinates characterizing the retroreflecting fabric deviates by no more than (±)15% or even by no more than (±)10% from the corresponding color coordinations of the fabric when measured according to International Standard CIE94.

The term color coordination(s) refers to the standard color space coordinates Lab, L being the lightness and a and b being the color-opponents green-red and blue-yellow. These coordinates are typically used to characterized colors and tones in the visible spectrum of colors. It is to be understood that, in the context of the present disclosure, color coordination is measured according to International Standard CIE94. Further, in the context of the present disclosure, the term ΔE (delta E) refers to the difference or distance between two colors as measured according to the International Standard CIE94.

In some embodiments, the retroreflecting fabric is characterized by a ΔE value with respect to the fabric of no more than 5, at times no more than 4 or even no more than 3.

The bottom surface of the fabric is coated by one or more bottom layers, which are stacked one on top of the other, each comprising at least one polymeric material. A first bottom layer thus comprises at least one first polymeric material. The at least one first polymeric material is typically a thermoplastic polymer, that may be the same or different from the embedding polymeric material, and may, by some embodiments, be selected from aromatic polyurethane, aliphatic polyurethanes, PVC, polyolefin (PP), TPU/PVC blends, PVC+alloy, TPO (thermoplastic polyolefin), and TPE (thermoplastic elastomers).

In some embodiments, the first bottom layer may have a thickness of between about 5 and 100 μm. In some other embodiments, the thickness of the first bottom layer may be between about 5 and 80 between about 5 and 70 between about 5 and 60 between about 5 and 50 or even between about 5 and 40 μm.

According to some embodiments, the first bottom layer may have an areal density of between about 6-10 g/m².

As noted above, the bottom surface of the fabric may be coated by more than one bottom layer. Thus, according to some embodiments, the first bottom layer may be coated by a second bottom layer, that comprises at least one second polymeric material. The at least one second polymeric material may be the same or different from the first polymeric material.

In some embodiments, the at least one second polymeric material may be selected from aromatic polyurethanes, aliphatic polyurethanes, PVC, polyolefin (such as polypropylene and polyethylene), TPU/PVC blends, PVC+alloy, TPO, and TPE.

It is of note that the first, second and/or embedding polymeric materials may be different from one another by at least one of the type of the polymer, molecular weight, melt-flow index (MFI), shore hardness, aromaticity, etc.

According to some embodiments, the second bottom layer may have a thickness of between about 50 and 800 μm. According to other embodiments, the thickness of the second bottom layer may be between about 50 and 750 μm, between about 50 and 700 μm, between about 50 and 650 μm, between about 50 and 600 μm, or even between about 50 and 500 μm.

According to some embodiments, the second bottom layer may have an areal density of between about 50-800 g/m².

Depending on the fabric type, weave density and/or the material from which it is made, various additional functional layers may be required. In some embodiments, a binding layer may be present between the fabric's bottom surface and the first bottom layer, or between the fabric's top surface and the top layer. Such a binding layer may, for example, comprise at least one polymer, with or without an adhesion promotor. A specific example of such a binding layer comprises a plastisol composition (e.g. a suspension of PVC particles in a liquid plasticizer), that is used to facilitate binding of bottom and top layers comprising PVC onto the fabric.

It is noted that each of the functional layers may comprise at least one additive, such as a coloring agent, a UV-stabilizer, an oxygen scavenger, a plasticizer, a filler, etc., to render the retroreflecting fabric with an additional desired property.

In another one of its aspect, the present disclosure provides a process for manufacturing a retroreflecting fabric, comprising:

applying a retroreflecting mixture, comprising retroreflecting particles and at least one embedding polymeric material onto a top surface of a fabric;

exposing the fabric to conditions permitting formation of a retroreflective top layer comprising said retroreflecting particles being at least partially embedded in said at least one embedding polymeric material, thus obtaining said retroreflecting fabric.

In a further aspect, the present disclosure provides a process for manufacturing a retroreflecting fabric, comprising:

applying a retroreflective mixture, comprising retroreflecting particles and at least one embedding polymeric material onto a top surface of a fabric;

exposing the fabric to conditions permitting formation of a retroreflective top layer having a thickness of the embedding polymeric material of between about 3 and 10 μm comprising at most 60 wt % retroreflecting particles embedded in said at least one embedding polymeric material, thus obtaining said retroreflecting fabric.

In yet another aspect, there is provided a process for manufacturing a retroreflecting fabric, comprising:

applying a retroreflective mixture, comprising retroreflecting particles and at least one embedding polymeric material onto a top surface of a fabric, the top surface being devoid of a metallic or a mirror layer;

exposing the fabric to conditions permitting formation of a retroreflective top layer comprising said retroreflecting particles being at least partially embedded in said at least one embedding polymeric material, thus obtaining said retroreflecting fabric, wherein no metallic layer and/or mirror layer is applied onto the top surface (or below the retroreflective top layer) during the process.

The retroreflecting mixture may comprise at least 10 wt % of retroreflecting particles, which may be may be selected from those described herein.

The retroreflective mixture typically comprises said retroreflective particles and said at least one embedding polymeric material. In some embodiments, the retroreflective mixture may be provided in the form of a polymeric melt, in which the retroreflective particles are mixed and/or dispersed, with or without the addition of plasticizers.

In other embodiments, the retroreflective mixture may be in the form of a retroreflective paste; in such embodiments, the retroreflective mixture typically further comprises at least one first solvent.

The term solvent refers to any liquid that is capable of solubilizing or swelling of polymeric material, thus reducing the viscosity of the polymeric material to enable its spreading or pasting onto a surface. The solvent is typically one or more organic liquids, having suitable polarity and chemical compatibility to enable solubilizing of the polymeric material. In some embodiments, the first solvent may be selected from methylethyl-ketone (MEK), dimethyl-formamide (DMF), dimethylsulfoxide (DMSO), water, isopropanol (IPA), ethyl acetate, tetrahydrofuran (THF), toluene, butanol, and mixtures thereof. As some polymers are water soluble, it is also envisioned that the solvent may be water.

Where two first solvents are used in the formulation of the retroreflective paste, the solvents may be provided at any weight or volume ratio, for example between 1:10 and 10:1, between 1:5 and 5:1, or even between 1:2 and 2:1.

According to some embodiments, the at least one embedding polymeric material is present in said retroreflective paste in an amount of at least 10 wt %. According to some other embodiments, the retroreflective paste may comprise between about 10 and 30 wt % of said retroreflective polymeric material.

Once applied onto the top surface of the fabric in a manner to be described, the fabric is exposed to conditions that permit the formation of a retroreflective top layer. In embodiments where the retroreflective mixture is a melt, the retroreflective mixture is typically applied onto the fabric at elevated temperatures, e.g. between about 160 to 230° C., and is then left to cool and solidify.

In embodiments wherein the retroreflective mixture is a paste, the conditions for forming the top layer include evaporation of the first solvent(s), thereby forming the retroreflective top layer as the solvent evaporates. These conditions may, in some embodiments, be exposing the fabric to a first temperature of between about 60 to 180° C. In such embodiments, the fabric may be exposed to said first temperature for a period of time of between about 30 to 90 seconds.

In some embodiments, the retroreflective paste applied onto said top surface forms a solvent-wet layer having an areal density of between about 40 and 150 g/m².

As noted above, the retroreflecting fabric may comprise additional layers. Hence the process of manufacturing may comprise additional steps of forming one or more additional layers, either associated with the top surface of the fabric (i.e. formation of layers between the top surface and the topmost retroreflective layer) or coating the bottom surface of the fabric.

The additional layers may be applied in the form of various pastes or in melt form.

Thus, by some embodiments, the manufacturing process may further comprise forming a first bottom layer by:

applying at least one first polymeric material in a melt form onto the bottom surface of the fabric to form a first bottom layer, and permitting the first bottom layer to solidify.

The term melt form (or melt state) refers to a physical state of a polymer which is between a solid state and a liquid state, wherein the polymer is in a flowable phase substantially without using any solvent. Such melt state/form is typically obtained by heating the polymeric material while mixing, with or without application of increased pressure. An exemplary method of obtaining a polymer melt is by extruding, however other methods facilitating melting of the polymeric material are also contemplated to be within the scope of the present disclosure.

In other embodiments, the manufacturing process may comprise forming said first bottom layer by:

applying a first paste onto a bottom surface of the fabric, the first paste comprising at least one first polymeric material and at least one second solvent; and exposing the fabric to conditions permitting evaporation of the at least one second solvent to obtain a first bottom layer.

Said first paste comprises the at least one first polymeric material (which may be selected from those described herein) and at least one second solvent. According to some embodiments, the at least one first polymeric material is present in said first paste in an amount of at least 10 wt %. According to some other embodiments, the first paste may comprise between about 10 and 30 wt % of said first polymeric material.

In some embodiments, the second solvent may be the same or different from the first solvent, and may be selected from methylethyl-ketone (MEK), dimethyl-formamide (DMF), dimethylsulfoxide (DMSO), water, isopropanol (IPA), ethyl-acetate, tetrahydrofuran (THF), toluene, butanol, and mixtures thereof. Where two second solvents are used in the formulation of the first paste, the solvents may be provided at any weight (or volume) ratio, for example between 1:10 and 10:1, between 1:5 and 5:1, or even between 1:2 and 2:1.

The first paste may, by some embodiments, further comprise at least one adhesion promotor that enables at least partial cross-linking of the first bottom layer and the additional bottom layers to be applied thereonto, thus enabling good adhesion between the bottom layers. The cross-linking agent may be typically selected from aromatic polyisocyanates and aliphatic polyisocyanates. In some embodiments, the polymer is a curable or crosslinkable polymer. The crosslinking agent, as may be known to a person skilled in the art, refers to a chemical entity that is capable of reacting with a polymer to form a link between two polymeric chains. Crosslinking may for example be achieved by employing appropriate chemical conditions, as may be known to a person skilled in the art, such as heating or exposure to humidity.

In some embodiments, the first paste applied onto the bottom surface forms a solvent-wet layer having an areal density of between about 40 to 150 g/m$^2$.

Once applied onto the bottom surface of the fabric in a manner to be described, the fabric is exposed to conditions that permit evaporation of the second solvent(s), thereby forming said first bottom layer of the first polymeric material as the solvent evaporates. These conditions may, in some embodiments, be exposing the fabric to a temperature of between about 60 to 180° C. In such embodiments, the fabric may be exposed to said temperature for a period of time of between about 30 to 90 seconds.

Although full evaporation is typically desired, it is possible that the polymeric layers may contain residual amounts of solvents, e.g. up to 5 wt % of solvent.

It is of note that heating of the fabric to evaporate the first and/or second solvents may be carried out by exposing the fabric to an elevated temperature, or by applying gradual heating according to a desired heating profile, for example heating at a specific sequence of temperatures, gradually increasing or decreasing the temperature for a defined period of time, etc.

Heating may be carried out by any known means, for example by infrared (IR) irradiation (heating lamps), circulating hot air, contact with a heated surface, and other techniques known to a person of skill.

Applying the retroreflecting paste and/or the first paste onto the top and bottom surfaces, respectively, may be carried out by any known method that provides the desired thickness and/or areal density of the wet layers. Such methods may include pasting, brushing, spraying, dipping, gravure, and similar methods. In some embodiments, the retroreflective paste and/or first paste are applied by pasting, for example in a knife-over-air or knife-over-roll method, in which the position of the knife relative to the fabric, the properties of the supporting surface, and the speed of pasting are some of the parameters that influence the thickness and uniformity of the pasted layers.

Preparation of the pastes may be carried out by utilizing a variety of production means known to a person of skill. Depending on the amount of polymeric material in the paste, the polymer's molecular weight, the nature of the solvents used and whether or not various additives are added to the paste, paste preparation parameters may be selected, modified and controlled in order to obtain a paste with a desired viscosity. For example, duration and temperature of mixing may be adjusted, specific types of stirrers or mixers may be used, baffles with various geometries may or may not be used, etc.

In some embodiments, a second bottom layer may be applied onto the first bottom layer, for example in order to provide water-impermeability or increase mechanical strength of the retroreflecting fabric. The second bottom layer, comprising a second polymeric material (selected from those described herein), is typically, albeit not exclusively, applied onto the first bottom layer in a melt state, that is then permitted to solidify.

In some embodiments, when the a layer (e.g. the retroreflective top layer, the first bottom layer, and/or the second bottom layer) is applied in melt form, the application may be carried out by calendering. In the calendering process, the fabric and the polymer melt are being concomitantly fed in between two rollers, thus evenly spreading and compacting the polymer melt onto the fabric. The thickness of the applied layer may thus be determined by the parameters of the calendering step, such as the feed rate of the fabric and/or polymer melt, the rolling speed of the rollers, the size of the gap between the rollers, the temperature of the melt and/or rollers, etc.

In other embodiments, the melt form is applied by extrusion coating or by lamination.

Similarly, at least one intermediate top layer may be first applied onto the top surface of the fabric, onto which the retroreflective top layer is applied (i.e. the top-most layer is the retroreflective layer, with the intermediate layers laying between the top surface of the fabric and the retroreflective top layer). Such intermediate top layers may also be formed by applying one or more layers of a polymeric material in a melt state onto the top surface of the fabric, or by applying one or more suitable pastes followed by evaporation of the solvents from these suitable pastes.

When the intermediate top layers are applied in a melt state, depending on the nature of the polymer constituting the intermediate top layers, application of a binding layer may be required onto the intermediate top layer before applying a retroreflective paste, thus improving adhesion between the intermediate top layer and the retroreflective top layer.

As may be appreciated, processes of this disclosure involve applying various functional layers onto the fabric to obtain various properties, as noted above, with a top-most layer of the reflecting fabric being a reflective layer.

Thus, in another aspect, the present disclosure provides a process for manufacturing a retroreflecting fabric, comprising:

(a) applying a retroreflecting mixture, comprising retroreflecting particles and at least one embedding polymeric material onto a top surface of a fabric;

(b) exposing the fabric to conditions permitting formation of a retroreflective top layer comprising said retroreflecting particles at least partially embedded in said at least one embedding polymeric material;

(c) applying a first paste onto a bottom surface of the fabric, the first paste comprising at least one first polymeric material and at least one second solvent;

(d) exposing the fabric to conditions permitting evaporation of the at least one second solvent to obtain a first bottom layer;

(e) applying at least one second polymeric material in a melt state onto the first bottom layer to obtain a second bottom layer; and (f) permitting the second bottom layer to solidify, to thereby obtain said retroreflecting fabric.

In another aspect, the present disclosure provides a process for manufacturing a retroreflecting fabric, comprising:

(a') applying a first paste onto a bottom surface of the fabric, the first paste comprising at least one first polymeric material and at least one second solvent;

(b') exposing the fabric to conditions permitting evaporation of the at least one second solvent to obtain a first bottom layer;

(c') applying a retroreflecting mixture, comprising retroreflecting particles and at least one embedding polymeric material onto a top surface of a fabric;

(d') exposing the fabric to conditions permitting formation of a retroreflective top layer comprising said retroreflecting particles at least partially embedded in said at least one embedding polymeric material;

(e') applying at least one second polymeric material in a melt state onto the first bottom layer to obtain a second bottom layer; and (f) permitting the second bottom layer to solidify, to thereby obtain said retroreflecting fabric.

In some embodiments, the second polymeric material is applied onto the first bottom layer by calendaring. Prior to calendering (i.e. between steps (d) and (e) or between steps (d') and (e')), the process may comprise a step (d1 or d1') in which the first bottom layer heated. Such heating increases the tackiness of the first bottom layer by either melting its surface or activating the cross-linking agent (if such is used in the first bottom layer), thus facilitating adherence of the second bottom layer to the first bottom layer. According to such embodiments, the first bottom layer may be heated to a temperature of between about 160 to 230° C.

In yet another aspect, the present disclosure provides a process for manufacturing a retroreflecting fabric, comprising:

(i) applying at least one first polymeric material in a melt state onto a top surface of a fabric to obtain a top intermediate layer;

(ii) permitting the top intermediate layer to solidify;

(iii) applying at least one second polymeric material in a melt state onto a bottom surface of the fabric to obtain a first bottom layer;

(iv) permitting the first bottom layer to solidify;

(v) applying a retroreflective mixture, comprising retroreflecting particles and at least one embedding polymeric material onto the top intermediate layer; and (vi) exposing the fabric to conditions permitting formation of a retroreflective top layer comprising said retroreflecting particles at least partially embedded in said at least one embedding polymeric material, thus obtaining said retroreflective fabric.

In some embodiments, an additional preliminary step)(v° (between steps (iv) and (v)) of applying a binding layer is required before application of the retroreflective mixture in order to ensure adhesion of the retroreflective layer to the intermediate top layer.

The processes of this disclosure may be carried out on a continuous sheet of fabric (for example unrolled from a roll of fabric), or on pre-cut segments of fabric to be processed to final products at a later stage. Further, the process steps described herein may be carried out as part of a single manufacturing process, in a sequential array of manufacturing stations. Alternatively, the process steps may be carried out intermittently, namely, a stock of fabric with one or more layers may first be prepared and stored, and the other layers may be applied at a later stage. The same applies for the application of the second bottom layer, which may or may not be applied.

Thus, in another aspect this disclosure provides a process for manufacturing a retroreflecting fabric, comprising:

(A) applying a retroreflecting mixture, comprising retroreflecting particles and at least one embedding polymeric material onto a top surface of a fabric;

(B) exposing the fabric to conditions permitting formation of a retroreflective top layer comprising said retroreflecting particles at least partially embedded in said at least one embedding polymeric material;

(C) applying a first paste onto a bottom surface of the fabric, the first paste comprising at least one first polymeric material and at least one second solvent; and (D) exposing the fabric to conditions permitting evaporation of the at least one second solvent to obtain a first bottom layer, to thereby obtain said retroreflecting fabric.

It is noted that the sequence of steps may be interchangeable, namely, steps (C) and (D) may be carried out before steps (A) and (B).

In another aspect, this disclosure provides a retroreflecting fabric manufactured by the processes described herein.

As noted above, the retroreflecting fabric may be utilized for the manufacture of various items. Hence, one further aspect of this disclosure is a pre-cut fabric segment cut out of the retroreflective fabric described herein. A pre-cut fabric segment refers to a segment or a portion of the retroreflective fabric that is cut into desired dimensions or according to a desired pattern, that can be used as-is (for example a retroreflective patch) or further processed to a final retroreflecting article, such as those to be described below. The pre-cut segments may be cut out of the fabric prior to coating, and then processed by processes of this disclosure to be retroreflective. Alternatively, the pre-cut segments may be cut out of the retroreflecting fabric in either an integral cutting step at the end of the production process, an integral cutting step as part of the final article production process, or at a different facility after completion of the retroreflecting fabric manufacture process.

The retroreflecting fabric may be used to produce or to be incorporated into various articles. Thus, another aspect provides a retroreflecting article comprising the retroreflecting fabric described herein. The articles may comprise segments of the retroreflecting fabric, such as patches applied on the outer face of various items, or the articles may at times by made substantially out of the retroreflecting fabric.

Such articles may be garments, inflatable articles, and textile architectural structures (such as tents, hangers, canopies, etc.). In some embodiments, the article may be selected from a life-jacket, a life-vest, a diving suit, a life-raft, an oil boom, an inflatable boat, a tent, an inflatable saving wheel, a float, a buoy, a weather balloon, and similar inflatable items. It is of note that the articles may be made entirely out of the retroreflecting fabric, or at least a portion thereof may be made of the retroreflective fabric (for example a canopy of a life raft may be made of the retroreflecting fabric, while the body of the life raft may be made of another material).

Another aspect of this disclosure provides an inflatable life-jacket or life-vest made substantially out of the retroreflecting fabric as described herein.

A further aspect of this disclosure provides an inflatable life-raft made substantially out of the retroreflecting fabric as described herein.

Yet a further aspect of this disclosure provides an oil boom made substantially out of the retroreflecting fabric as described herein.

As used herein, the term "about" is meant to encompass deviation of ±10% from the specifically mentioned value of a parameter, such as temperature, pressure, concentration, etc.

Whenever a numerical range is indicated herein, it is meant to include any cited numeral (fractional or integral) within the indicated range. The phrases between a first indicate number and a second indicate number and "ranging/ranges from" a first indicate number "to" a second indicate number are used herein interchangeably and are meant to include the first and second indicated numbers and all the fractional and integral numerals therebetween.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5A shows the vests without impinging light, while FIG. 5B shows the vests when illuminated by moonlight-simulating ambient light.

DETAILED DESCRIPTION OF EMBODIMENTS

Retroreflecting fabrics of the present disclosure may comprise, as already noted, several functional layers, disposed at either or both of the top and bottom surfaces of the fabric, typically with the top-most layer being the retroreflective layer. Exemplary, non-limiting, configurations of such retroreflecting fabrics are schematically shown in FIGS. 1A-1D.

Figure 1A:
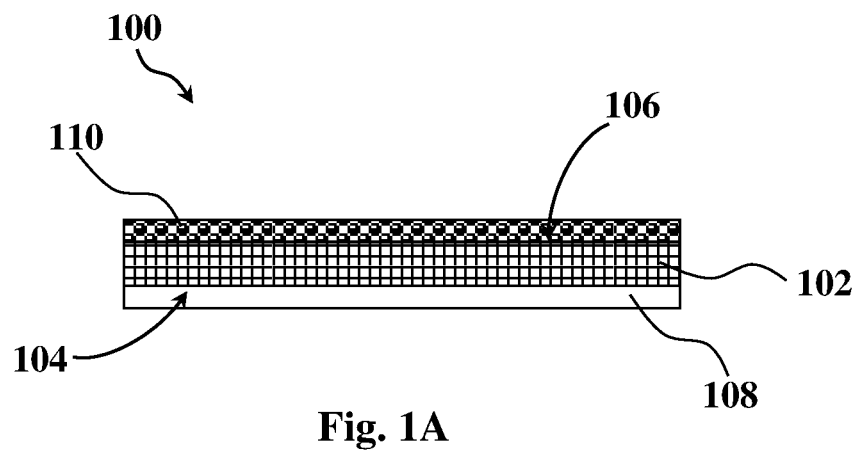
FIGS. 1A-1D are schematic representations of retroreflecting fabrics in various configurations according to embodiments of this disclosure.

Shown in FIG. 1A, is an exemplary retroreflecting fabric according to an embodiment of this disclosure. Retroreflecting fabric 100 comprises a fabric 102, for example a synthetic fabric made of nylon, polyethylene fibers, etc., and having a bottom surface 104 and a top surface 106. In this example, the bottom surface 104 is coated by a bottom layer 108, for example a polymeric layer that provides water-impermeability, while the top surface 106 is coated with a retroreflective top layer 100, typically comprising a polymeric matrix into which retroreflective particles are embedded. The retroreflective particles retroreflect impacting light, typically in the visible spectrum, and allow detection and identification of an article or comprising the fabric when located in poorly illuminated surroundings.

It is to be appreciates that in other embodiments the retroreflecting fabric may not have a bottom layer 108.

Figure 1B:
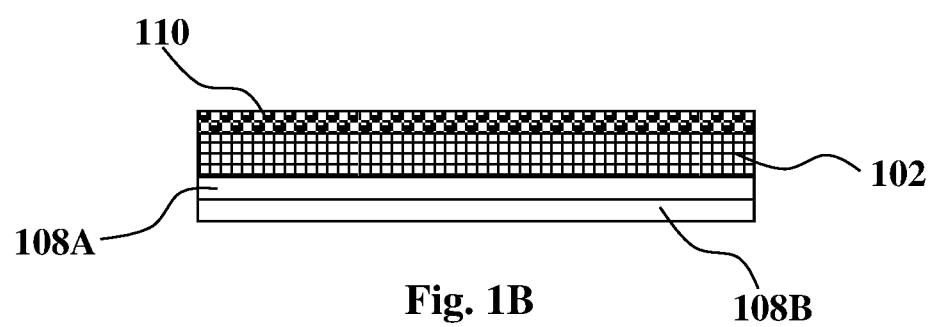

Another example is provided in FIG. 1B, in which the fabric 102 is coated by a top retroreflective layer 110, and first and second bottom layers 108A,108B respectively. The first and second bottom layers may be similar in their function, or each having a different functionality; for example, one of the bottom layers may provide water-impermeability, while the other bottom layer may provide outdoor resistance, UV protection, abrasion resistance, etc.

Figure 1C:
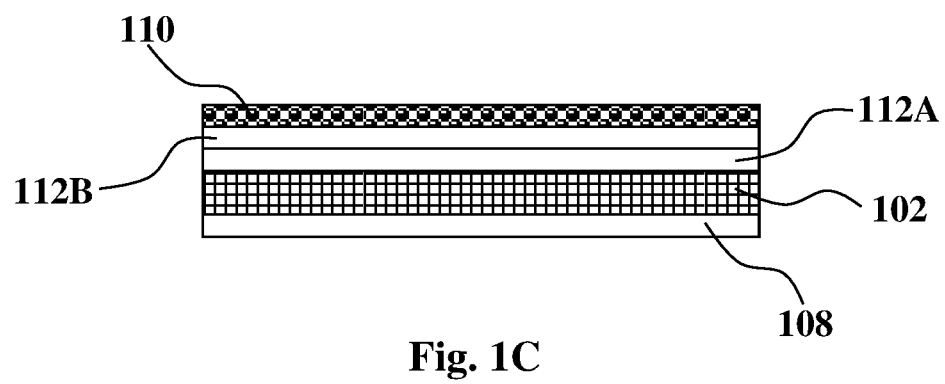

As a man of the art would appreciate, a plurality of functional layers may be provided on either or both of the bottom and top surfaces of the fabric. For example, FIG. 1C shows a retroreflecting fabric, having a plurality of top layers (112A,112B), each having a desired function, with the top-most layer 110 being the retroreflective layer. the number of functional layers in the structure of the retroreflective fabric may vary depending on the desired functionality, as well as the degree of flexibility required from the retroreflective fabric and/or its weight (or areal density).

Figure 1D:
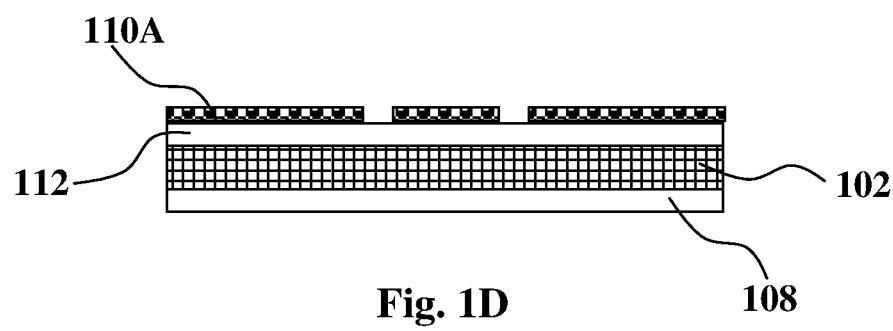

As noted above, the retroreflective top layer does not necessarily need to coat the entire top surface. In some cases, it is desired that only selected portions of the top surface will be coated with the retroreflective composition. As shown in FIG. 1D, the retroreflective top layer may be applied on defined portions of the top surface, thereby forming non-continuous retroreflective regions 110A. These regions may be of any desired shape and size, for example in the shapes of letters, numerals, symbols, patters, etc., thus resulting in a retroreflecting fabric that carried a retroreflective message or pattern.

Figure 2:
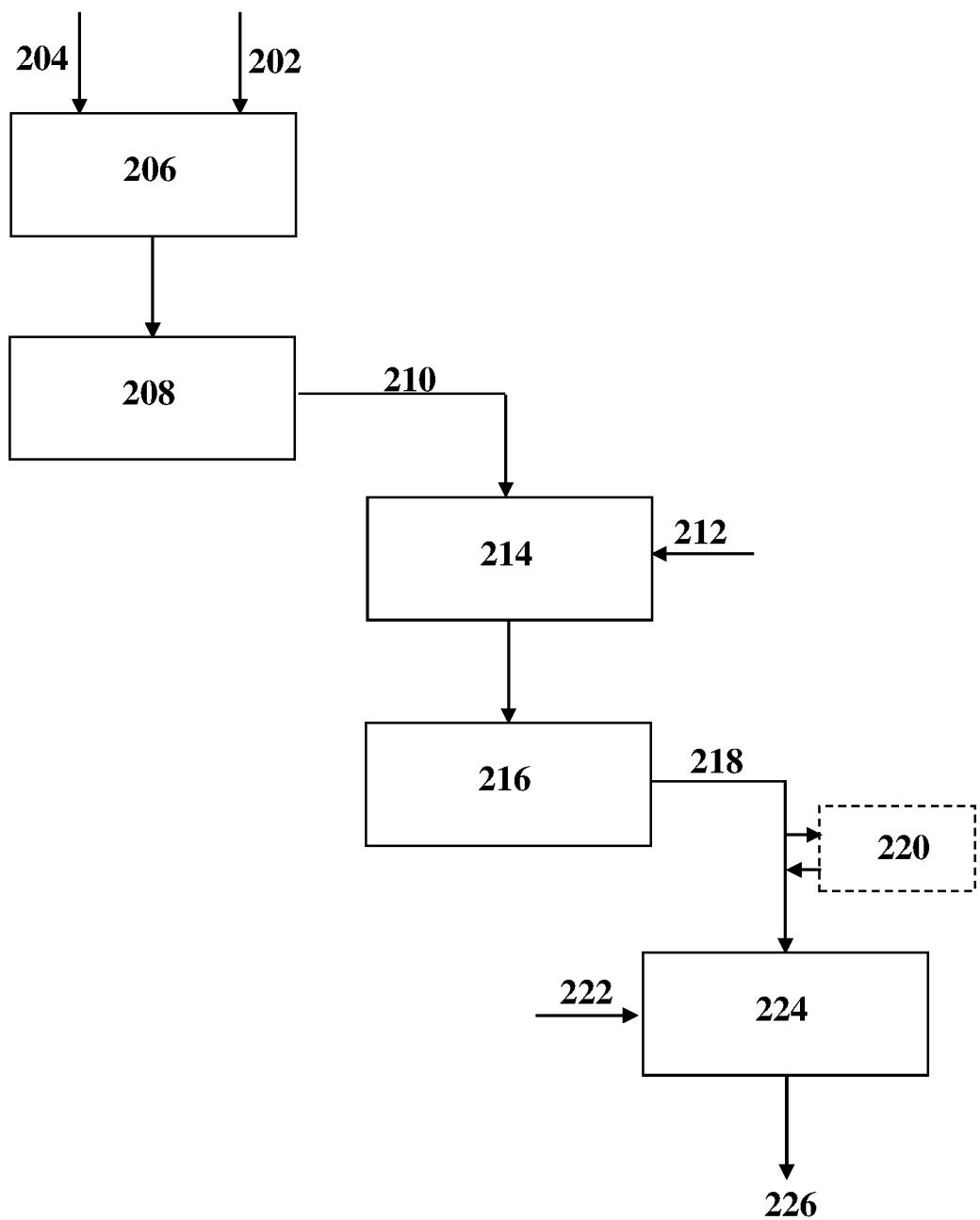
FIG. 2 is a schematic exemplary manufacturing process of a retroreflecting fabric according to an embodiment of this disclosure.

An exemplary manufacturing process of a retroreflecting fabric according to one embodiment of this disclosure is schematically shown in FIG. 2. At a first stage, fabric 202 and a first paste 204 comprising a first polymeric material and at least one second solvent are fed into a coating unit 206, in which the first paste is applied, for example by pasting, onto a bottom surface of the fabric. The second solvent is then evaporated from the pasted fabric, for example by a heating station 208, to thereby result in a fabric having a first bottom layer 210.

At a next stage, the fabric 210 is fed into a second coating unit 214, into which a retroreflective paste 212 is also fed. The retroreflective paste 212 comprises an embedding polymeric material, at least one first solvent and retroreflective particles, and is applied onto the top surface (or over pre-existing top layers) of fabric 210, which is then fed into unit 216 (for example a heating unit) in which the first solvent is evaporated to form the retroreflective top layer, resulting in retroreflecting fabric 218.

By modifying and controlling various parameters of the pastes (such as polymer concentration, polymer type, molecular weight, solvents type, etc.) and of the coating processes (feeding velocity, flux of paste, type of substrate, distance of the pasting element from the fabric, temperature, etc.) the thickness, eventual weight and homogeneity of the various layers may be controlled. Such parameters may vary when using different coating techniques and different fabric or polymeric materials.

The retroreflecting fabric 218 may be used as such, or may be processes to be coated with further functional bottom layers. For example, the retroreflecting fabric 218 may be fed into an calendering unit 226, into which a polymeric melt 222 is concomitantly fed (i.e. from an extrusion unit), to apply a second bottom layer to retroreflecting fabric 218, thus providing a retroreflecting fabric 226 with additional functional bottom layers. In some instances, the retroreflecting fabric 218 is required to undergo a pre-treatment of the first bottom layer to permit the second bottom layer to be adhered thereto. Such a pre-treatment may be carried out in unit 220; for example, the first bottom layer may need to be heated to increase its tackiness, pasted with a primer, undergo activation of a component (for example a cross-linking agent) in the first bottom layer, etc.

It is of note that each of the stations may be a stand-alone station or constituted by a separate, dedicated production facility. Alternatively, at least some, if not all, of the different manufacturing steps may be carried out in a sequence in a single production line one after the other, either on a continuous sheet of fabric or on pre-cut segments of the fabric.

Example

An exemplary manufacturing process of a retroreflecting fabric suitable for preparing inflatable products (such as life-vests, life-rafts, inflatable boats, etc.) will now be described. It is to be understood that the example is provided in a non-limiting fashion. Similar processes within the scope of the present disclosure may be provided for the manufacturing of different types of retroreflecting fabrics with different functional layers (providing that the top-most layer is a retroreflective layer).

A first paste comprising 25 wt % polyurethane resin, 50 wt % methylethylketone (MEK) and 25 wt % dimethylformamide (DMF) was prepared by dissolving the polyurethane during mixing for at least 48 hours to afford complete dissolution. Prior to application onto the fabric, app. 2 wt % of an aromatic diisocyanate was added.

The first paste was applied by a knife-on-air or a knife-on-roll pasting method onto the bottom surface of a nylon fabric having an areal density of app. 273 g/m$^2$, to provide a wet first bottom layer having an areal density of approximately 40 g/m$^2$. The fabric was then dried by evaporating the solvents at a temperature of about 120° C., until a first polyurethane bottom layer having an areal density of 6-10 g/m$^2$ was obtained.

A second paste comprising 25 wt % polyurethane resin (the same or different from that of the first paste), 50 wt % methylethylketone (MEK) and 25 wt % dimethylformamide (DMF) was prepared by dissolving the polyurethane during mixing for at least 48 hours to afford complete dissolution. Prior to application onto the fabric, 15 wt % of retroreflective particles were added to the paste to yield a retroreflective paste. Retroreflective microspheres having an average diameter of 40-50 µm and made of barium-titanate glass, hemispherically coated with aluminum were used.

The retroreflective paste was applied by a knife-on-air or a knife-on-roll pasting method onto the top surface of the fabric, to provide a wet top layer having an areal density of approximately 40 g/m$^2$. The fabric was then dried by evaporating the solvents at a temperature of 120° C., until a retroreflective top layer having an areal density of 6-10 g/m$^2$ was obtained.

In order to increase the fabric's strength and afford air and water tightness, a second bottom layer was applied. Neat polyurethane particles were fed into an extruder to provide a polyurethane melt. Prior to application of the molten polyurethane, the first bottom layer was heated by IR lamps to activate the diisocyanate in the first bottom layer. Such activation improves the adhesion of the polyurethane melt to the first bottom layer. After activation, the melt polyurethane and the fabric were fed into a calendering unit, in which the gap between the heated calendars was calibrated to provide a molten polyurethane second bottom layer having a thickness of between 50 and 800 µm. The reflecting fabric was then cooled to solidify the second bottom layer.

The reflecting fabric was tested for light reflectivity according to Israeli Standard 12899 (part 1, 2014). The measurement was carried out in a retro-reflectometer at a light impact angle of 5° and reading angle of 0.33° C. The results are provided in Table 1.

TABLE 1

Retroreflectivity test results

| Sample # | Fabric color* | \multicolumn{4}{c}{Reflectivity [cd/(m$^2$ · lux)]} |
|---|---|---|---|---|---|
| | | Result 1 | Result 2 | Result 2 | Average |
| Ref | Spanish | 0.4 | 0.4 | 0.4 | 0.4 |
| N16100* | yellow | 1.5 | 1.5 | 1.1 | 1.4 |
| N16101** | | 2.3 | 1.9 | 1.9 | 2.0 |
| Ref | Neon | 0.8 | 0.8 | 0.8 | 0.8 |
| N16102* | yellow | 1.5 | 1.1 | 1.5 | 1.4 |
| N16103** | | 1.9 | 1.9 | 1.9 | 1.9 |

*retroreflecting layer prepared from a mixture containing 10 wt % particles
**retroreflecting layer prepared from a mixture containing 15 wt % particles As evident from the reflectivity results, the reflecting fabric provides reflectivity values which are significantly higher compared to the non-coated standard bright colored fabric that is used for production of life-vests.

The effect of the functional layers on the color coordinations of the retroreflecting fabric as compared to the uncoated fabric is shown in Table 2, as measured according to International standard CIE94.

TABLE 2

Change in color coordinations

| Sample # | Color | L | | a | | b | | | Average |
| | | measured | % deviation | measured | % deviation | measured | % deviation | ΔE | % deviation |
|---|---|---|---|---|---|---|---|---|---|
| Ref 1 | Spanish | 76.83 | — | 13.90 | — | 85.79 | — | — | — |
| N16100* | yellow | 72.06 | −4.2% | 12.25 | −11.8% | 73.80 | −12.1% | 3.13 | −9.4% |
| N16101** | | 72.75 | −5.3% | 10.89 | −21.6% | 91.76 | −14.0 | 3.18 | −13.6% |
| Ref 2 | Neon | 92.73 | — | −16.77 | — | 91.76 | — | — | — |
| N16102* | yellow | 89.37 | −3.6% | −16.05 | 4.3% | 84.08 | −8.4 | 2.21 | −2.5% |
| N16103** | | 88.19 | −4.9% | −16.20 | 3.4% | 81.74 | −10.9% | 2.96 | −3.3% |

*retroreflecting layer prepared from a mixture containing 10 wt % particles
**retroreflecting layer prepared from a mixture containing 15 wt % particles As evident from Table 2, no significant color changes are observed between the uncoated fabric and the retroreflecting fabric. Namely, the various functional layers applied onto the fabric do not change the color coordinations by more than 15% on average, thus permitting the original color of the fabric to be visible under good illumination conditions, while providing satisfactory retroreflectance in poorly illuminated surroundings.

Figure 3A:
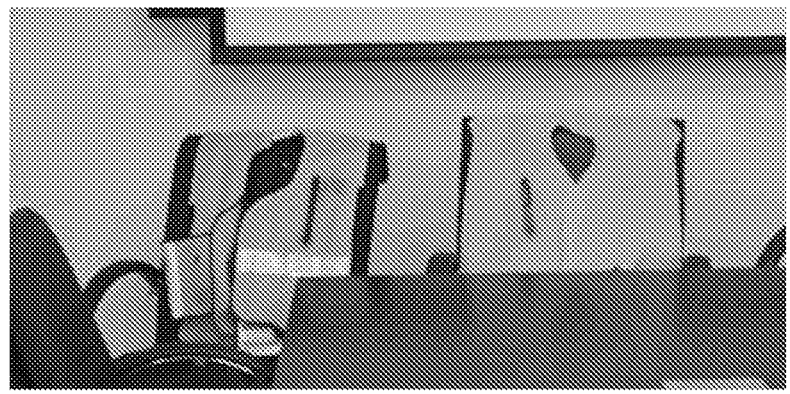
FIGS. 3A-3B are photographs of a vest having a patch of standard reflecting material and an inflatable life-vest made out of the retroreflective fabric in daylight (FIG. 3B) and in darkness when illuminated by moonlight-simulating ambient light (FIG. 3B).
Figure 3B:
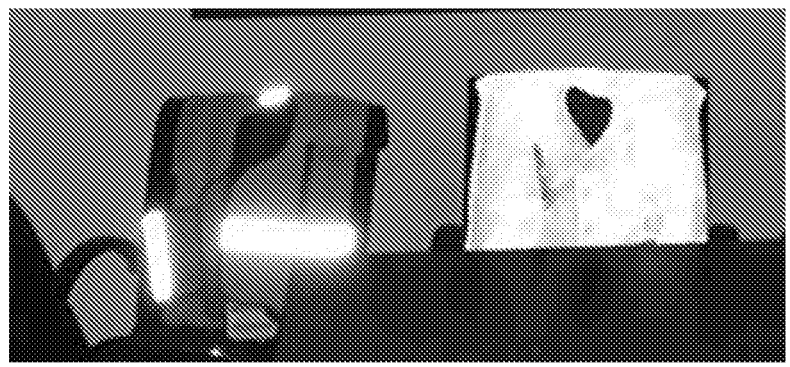

As also be seen in FIGS. 3A-3B, which show a vest having a patch of a standard reflecting material and an inflatable life-vest made out of the retroreflective fabric in daylight (FIG. 3B) and in darkness when illuminated by moonlight-simulating ambient light (FIG. 3B). As can be seen, the retroreflecting fabric provides satisfactory retroreflectance as compared to the standard patch, enabling detection in poorly illuminated surroundings. Further, as evident from FIGS. 3A-3B, application of the functional layers did not significantly impair the flexibility of the fabric, thus permitting the manufacture of an inflatable life-vest that is substantially made of the retroreflecting fabric (and not merely including application of reflective patches). This increase the retroreflective area of the life-vest, thereby increasing the capability to identify and locate a survivor in dark surroundings.

Moreover, as clearly seen, application of standard reflective patches masks the original color of the fabric. However, in the retroreflecting fabric, as shown in Table 2, very little deviation from the original color coordinates of the fabric results from the application of the functional layers. As seen in FIG. 3A, such small deviations are substantially undetected by the naked eye.

Figure 4A:
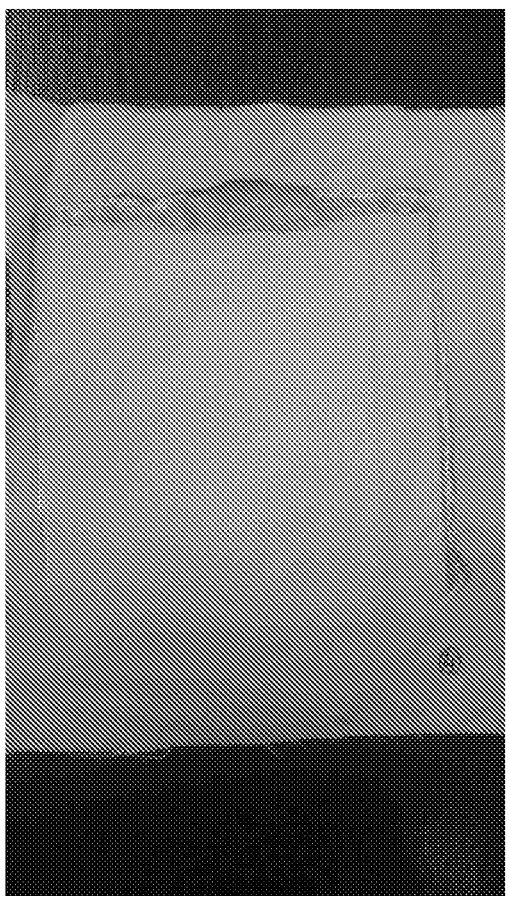
FIGS. 4A-4B are photographs of a retroreflective fabric in which an area has been applied with a top layer of the retroreflective composition having a thickness of about 3-10 μm, and areas onto which a thicker top layer of retroreflective composition was applied, as viewed in daylight (FIG. 4B) and in darkness when illuminated by moonlight-simulating ambient light (FIG. 4B).
Figure 4B:
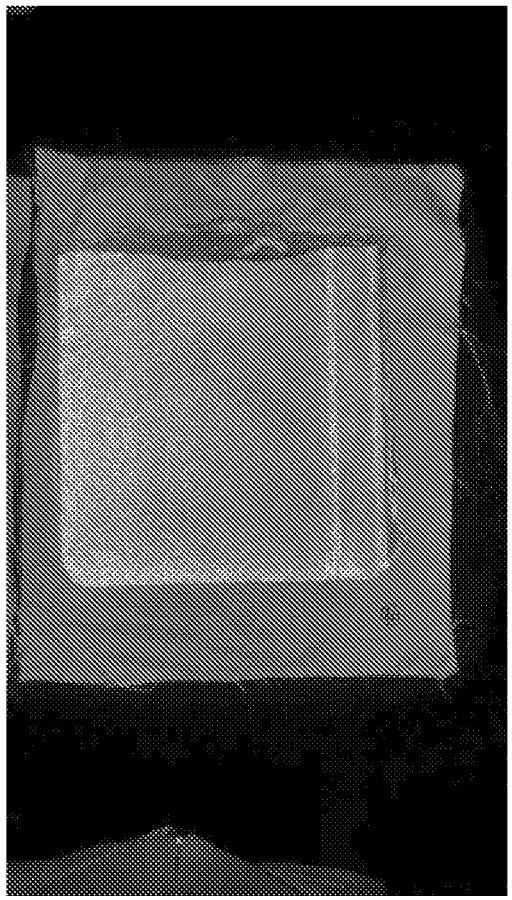

Further, as seen in FIGS. 4A-4B, a top layer of the retroreflective composition having a thickness of about 3-10 µm showed satisfactory retroreflection properties, while areas onto which a thicker top layer of retroreflective composition (simulating the thickness of standard reflective patches) was applied did not show any retroreflection or a non-satisfactory retroreflection.

Figure 5A:
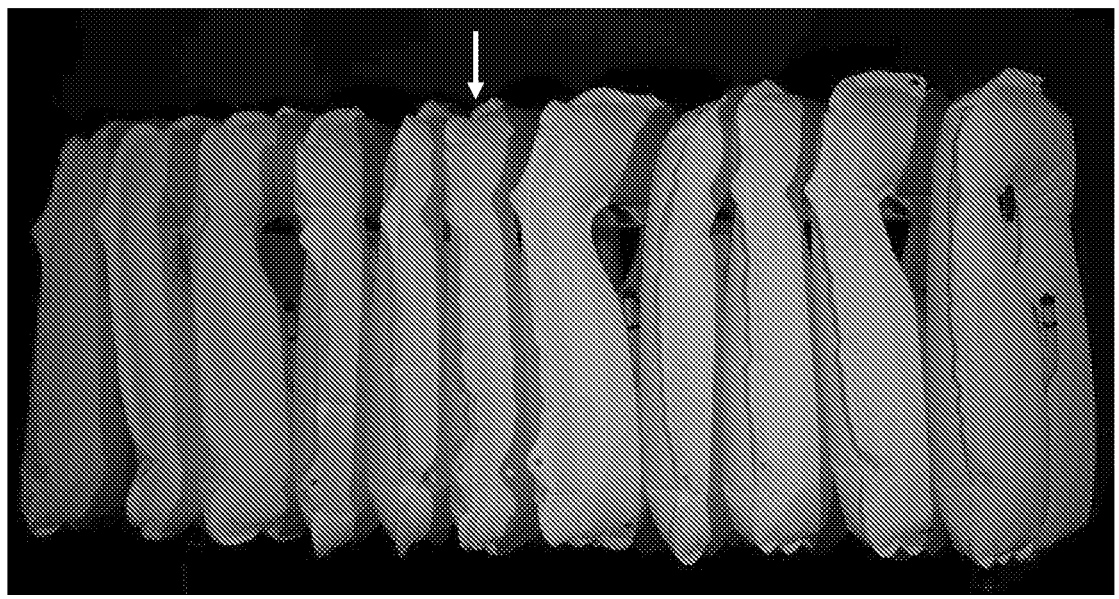
FIGS. 5A-5B are photographs of vests, from which one vest is made out of the retroreflective fabric of this disclosure, while the others are made of the base fabric however without the retroreflective layers.
Figure 5B:
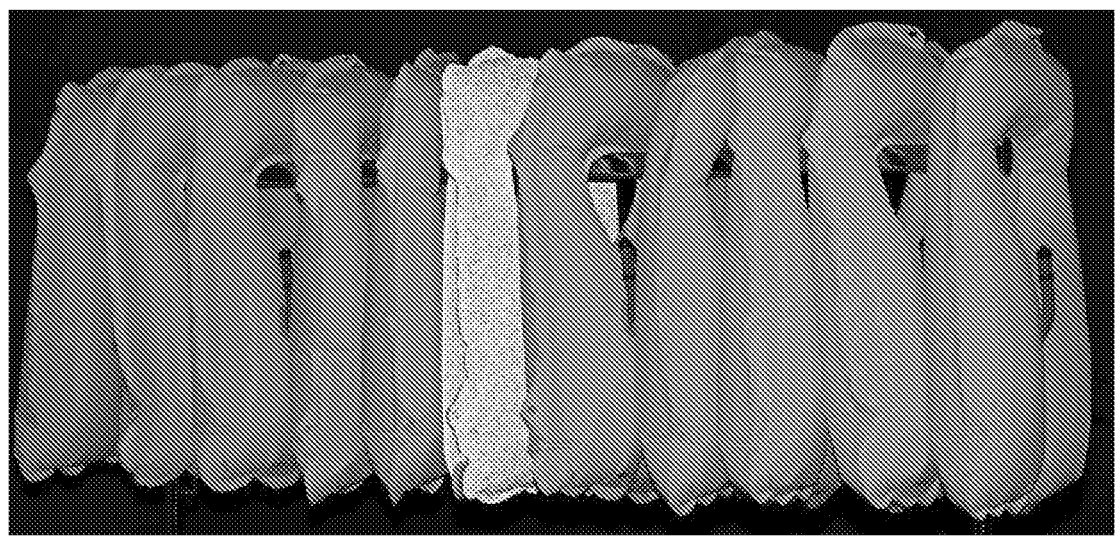

Another example is provided in FIGS. 5A-5B. All vests shown are made out of the same basic fabric, however, the vest marked by the arrow in FIG. 5A is made of the basic fabric treated by processes of the present disclosure in order to render it retroreflective. As clearly seen, the addition of the retroreflective layer does not affect the basic color of the fabric, and provides retroreflection when illuminated by moonlight-simulating ambient light.

The invention claimed is:

1. A retroreflecting fabric, comprising a fabric having a top surface and a bottom surface,
    at least a portion of the top surface being associated with at least one top layer of a retroreflective composition, the retroreflective composition comprising retroreflecting particles at least partially embedded in a matrix of at least one embedding polymeric material, the retroreflective fabric being devoid of a metallic layer and/or devoid of a mirror layer;
    wherein the bottom surface is coated by one or more bottom layers, at least one bottom layer being water impermeable.

2. The retroreflective fabric of claim 1, wherein the retroreflective composition comprises between about 10 and 60 wt % retroreflecting particles out of the total weight of the retroreflective composition.

3. The retroreflecting fabric of claim 1, wherein the matrix in the top layer has a thickness of between about 3 and 10 µm in which the particles are at least partially embedded.

4. The retroreflecting fabric of claim 1, wherein the retroreflecting particles are characterized by at least one of:
    (i) having an average particle size of between about 10 and 100 µm;
    (ii) being made of metal; and
    (iii) being made of plastic of glass, at least partially coated by metal.

5. The retroreflecting fabric of claim 1, wherein the top layer has an areal density of between about 6-10 g/m$^2$.

6. The retroreflecting fabric of claim 1, wherein the fabric is a synthetic fabric having an areal density of between about 50 and 500 g/m$^2$.

7. The retroreflecting fabric of claim 1, wherein the bottom said one or more bottom layers comprise at least one first bottom layer comprising at least one first polymeric material.

8. The retroreflecting fabric of claim 7, wherein the first bottom layer has a thickness of between about 5 and 100 µm, and/or wherein the first bottom layer has an areal density of between about 6-10 g/m$^2$.

9. The retroreflecting fabric of claim 7, further comprising a second bottom layer, coating the first bottom layer.

10. The retroreflecting fabric of claim 9, wherein said second bottom layer has a thickness of between about 50 and 800 µm, and/or wherein the second bottom layer has an areal density of between about 50 and 800 g/m$^2$.

11. A retroreflecting article of manufacture comprising or being made substantially out of the retroreflecting fabric of claim 1, said article being selected from the group consisting of a pre-cut fabric segment cut out of the retroreflecting fabric, a garment, an inflatable article, and a textile architectural structure.

12. The retroreflecting article of manufacture of claim 11, wherein said article is selected from the group consisting of a life-jacket, a life-vest, a diving suit, a life-raft, an oil boom, an inflatable boat, a tent, an inflatable saving wheel, a float, a buoy, a weather balloon, and a canopy.

13. The retroreflecting fabric of claim 1, characterized by at least one of:
    (i) having retroreflectivity of visible light of at least 1 cd/(m$^2$·lux) as measured according to Israeli Standard 12899 (part 1, 2014);
    (ii) having color coordinations that deviate by no more than (±)15% on average from the fabric's color coordinations as measured according to International Standard CIE94;
    (iii) each of the color coordinates characterizing the retroreflecting fabric deviates by no more than (±)20% from the corresponding color coordinations of the fabric as measured according to International Standard CIE94; or
    (iv) having a ΔE value with respect to the fabric of no more than 5 as measured according to International Standard CIE94.

14. A process for manufacturing a retroreflecting fabric, comprising:
    applying a retroreflecting mixture, comprising retroreflecting particles and at least one embedding polymeric material onto a top surface of a fabric, the retroreflective fabric being devoid of metallic and/or devoid of a mirror layer;
    coating a bottom surface of the fabric with one or more bottom layers, at least one of said bottom layers is water impermeable;
    exposing the fabric to conditions permitting formation of a retroreflective top layer comprising said retroreflecting particles being at least partially embedded in said at least one embedding polymeric material, thus obtaining said retroreflecting fabric.

15. The process of claim 14, the retroreflecting mixture comprises at least 10 wt % of retroreflecting particles.

16. The process of claim 14, wherein (i) the retroreflecting mixture is applied onto the top surface in a melt form, or (ii) the retroreflecting mixture is in the form of a retroreflective paste, comprising said retroreflecting particles, said at least one embedding polymeric material and at least one first solvent.

17. The process of claim 14, further comprising:

applying at least one first polymeric material in a melt form onto the bottom surface of the fabric to form a first bottom layer; and permitting the first bottom layer to solidify.

18. The process of claim 17, further comprising:

applying at least one second polymeric material in a melt state onto the first bottom layer to obtain a second bottom layer; and permitting the second bottom layer to solidify.

19. The process of claim 14, further comprising:

applying a first paste onto a bottom surface of the fabric, the first paste comprising at least one first polymeric material and at least one second solvent; and exposing the fabric to conditions permitting evaporation of the at least one second solvent to obtain a first bottom layer.

20. The process of claim 19, further comprising:

applying at least one second polymeric material in a melt state onto the first bottom layer to obtain a second bottom layer; and permitting the second bottom layer to solidify.

* * * * *